US 6,685,279 B2

(12) United States Patent
Koyama

(10) Patent No.: US 6,685,279 B2
(45) Date of Patent: Feb. 3, 2004

(54) BRAKE CONTROL SYSTEM

(75) Inventor: Kotaro Koyama, Kanagawa (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/341,459

(22) Filed: Jan. 14, 2003

(65) Prior Publication Data

US 2003/0132665 A1 Jul. 17, 2003

(30) Foreign Application Priority Data

Jan. 17, 2002 (JP) ......................... 2002-009038

(51) Int. Cl.$^7$ ............................. B60T 8/34; B60T 8/48; B60T 8/40; B60T 8/58
(52) U.S. Cl. ................. 303/116.1; 303/113.1; 303/156; 303/158; 303/113.2
(58) Field of Search ........................... 303/116.1, 116.2, 303/113.2, 139, 140, 11, 119.1, 113.1, 156, 158, 190, 189, 114.1; 701/70, 71, 82, 83; 180/197; 188/DIG. 1, 358, 359

(56) References Cited

U.S. PATENT DOCUMENTS 5,938,296 A * 8/1999 Nakazawa ............... 303/113.2
6,024,424 A * 2/2000 Nakazawa et al. ....... 303/116.1
6,070,951 A * 6/2000 Nakazawa ............... 303/113.2

* cited by examiner

Primary Examiner—Douglas C. Butler
(74) Attorney, Agent, or Firm—Foley & Lardner

(57) ABSTRACT

A brake control system includes an ECU constructed to carry out pressure-increase assist control for restraining the opening of an OUT-side gate valve and opening inlet valves during a predetermined time when active brake control is switched from the state that it is effective for only one wheel cylinder to the state that it is effective for only another wheel cylinder.

10 Claims, 10 Drawing Sheets

BRAKE CONTROL SYSTEM

BACKGROUND OF THE INVENTION

The present invention relates generally to a braking device which allows active control of the brake-fluid pressure, and more particularly, to a brake control system having a brake line branched to wheel cylinders.

In recent years, vehicle-mounted braking devices have various functions added. Such braking devices are known, for example, in the form of an antiskid braking system for achieving shortening of the braking distance while maintaining the vehicle behavior stable by preventing wheel lock, a traction control system for preventing spin of driving wheels during vehicle acceleration and the like, a brake assist device constructed so that when the brake-fluid pressure operated by a driver is insufficient, this insufficiency of brake-fluid pressure is supplied to a wheel cylinder, and a vehicle stability control (VSC) system for securing the running stability of the vehicle by providing a braking force to the wheels regardless of presence of brake operation by a driver so as to remove oversteer or understeer of the vehicle.

The VSC system serves to automatically adjust, when the vehicle can oversteer or understeer, the brake-fluid pressure within the wheel cylinder without driver's brake operation to produce in the vehicle a lateral force opposed to oversteer or understeer. Due to its purpose of stabilizing the vehicle behavior, the VSC system is required to react to the vehicle behavior in a very short time. That is, in contrast to the antilock braking system, the VSC system is required to carry out braking in a very short time.

Further, in the antilock braking system which assumes brake operation carried out by a driver, the target brake-fluid pressure within the wheel cylinder cannot exceed the brake-fluid pressure within the master cylinder. On the other hand, in the VSC system, since control is carried out regardless of the presence or absence of driver's brake operation, the target brake-fluid pressure within the wheel cylinder is set to be higher than the brake-fluid pressure within the master cylinder, and is thus desired to be increased to a higher valve in a further short time.

Furthermore, when relatively great lateral acceleration is produced in the vehicle during cornering or the like and when the braking device is not actuated, this lateral acceleration affects a rotor of the braking device, which can be inclined or moved to the side of a brake piston, i.e. in the brake releasing direction. If the brake piston is pushed back in the brake releasing direction, and when the brake-fluid pressure is provided to the brake piston for brake actuation, the brake piston can make free run by an amount of this displacement, leading to delay of generation of a braking force. That is, as compared with the characteristic of brake-fluid pressure rise with no displacement of the brake piston, the responsivity of brake-fluid pressure rise can be degraded by an amount of the free-run section of the brake piston.

SUMARY OF THE INVENTION

It is, therefore, an object of the present invention to provide a brake control system which contributes to an enhancement in the pressure-rise responsivity during active brake control.

The present invention provides generally a brake control system for a motor vehicle, which comprises: a source of a brake-fluid pressure; a brake line connected to the source; an OUT-side gate valve arranged in the brake line, the OUT-side gate valve serving to open and close the brake line; branch lines branched from the brake line downstream of the OUT-side gate valve to wheel cylinders; inlet valves arranged in the respective branch lines, each inlet valve serving to open and close the corresponding branch line; a drain circuit which serves to discharge the brake-fluid pressure within each wheel cylinder to a reservoir; outlet valves arranged in the drain circuit, each outlet valve serving to open and close the drain circuit; a pump which supplies the brake-fluid pressure to a supply line of the brake line downstream of the OUT-side gate valve; and an ECU which controls operation of the valves and the pump, the ECU being so constructed as to: supply the brake-fluid pressure to the supply line by driving the pump with an opening of the OUT-side gate valve restrained; carry out active brake control for independently controlling the brake-fluid pressures within the wheel cylinders by selectively opening and closing the inlet valves; return the brake-fluid pressures within the wheel cylinders to the source by opening the OUT-side gate valve at completion of active brake control; and carry out pressure-increase assist control for restraining the opening of the OUT-side gate valve and opening the inlet valves during a predetermined time when active brake control is switched from a state that it is effective for only one of the wheel cylinders to a state that it is effective for only another wheel cylinder.

BRIEF DESCRIPTION OF THE DRAWINGS

The other objects and features will become apparent from the following description with reference to the accompanying drawings, wherein.

DETAILED DESCRIPTION OF THE INVENTION

Figure 1:
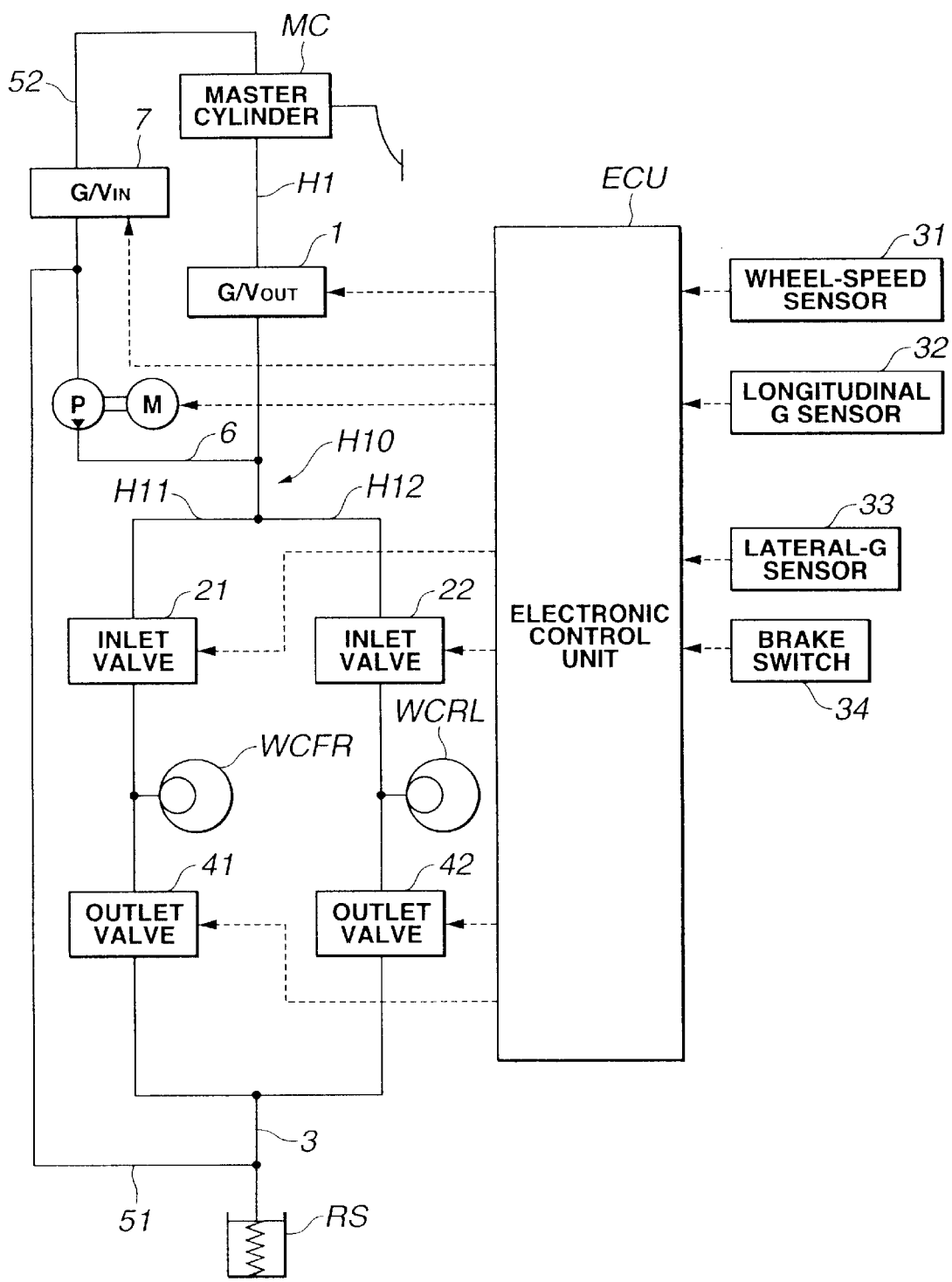
FIG. 1 is a block diagram showing a brake control system to which the present invention is applied.

Referring to the drawings, a brake control system embodying the present invention is described. Referring to FIG. 1, a brake line H1 is one of two systems of an X-type brake line. The X-type brake line is a line arrangement in which the lines for supplying brake fluid to the wheel cylinders of four wheels are divided into two systems, the lines of each system being connected to one of the front wheels and one of the rear wheels in such a way that one of the front wheel is a left wheel, and one of the rear wheels is a right wheel.

Brake line H1 is bifurcated into branch lines H11, H12, which are connected to wheel cylinders WCFR, WCRL of front-right wheel FR and rear-left wheel RL, respectively. A normally open OUT-side gate valve 1, which is open under non-energization, is arranged in brake line H1 at an upstream position between branch lines H11, H12 and a master cylinder MC. Normally open inlet valves 21, 22 are arranged in branch lines H11, H12 to open and close the branch lines. Normally closed outlet valves 41, 42, which are closed usually and open under energization, are arranged in a drain circuit 3 connecting wheel cylinders WCFR, WCRL and a reservoir RS.

Reservoir RS and master cylinder MC are connected to the suction side of a pump P through first and second suction circuits 51, 52, respectively. A discharge circuit 6 arranged on the discharge side of pump P is connected to a supply line H10 in brake line H1 and between OUT-side gate valve 1 and inlet valves 21, 22. A normally closed IN-side gate valve 7 is arranged in second suction circuit 52 to open and close the suction circuit.

Thus, by closing OUT-side gate valve 1, opening IN-side gate valve 7, and driving pump P, brake fluid can be supplied to supply line H10 at the absence of driver's brake operation. Moreover, in this state, by controlling opening/closing of IN-side gate valve 7 to control the amount of brake fluid to be supplied from pump P to supply line H10, and by controlling opening/closing of OUT-side gate valve 1 to control the flow of brake fluid discharged from supply line H10 to master cylinder MC, the brake-fluid pressure in supply line H10 can be controlled at a desired value. Further, in this state, by opening one or both of inlet valves 21, 22, the brake-fluid pressure within one or both of wheel cylinders WCFR, WCRL can be increased to the same pressure in supply line H10, generating a desired braking force. During this posture control or VSC control, outlet valves 41, 42 are closed in principle.

Actuation of pump P and valves 1, 21, 22, 41, 42, 7 is controlled by an electronic control unit ECU as control means. For executing VSC control as active brake control, the ECU carries out pressure-increase assist control under predetermined conditions.

Figure 2:
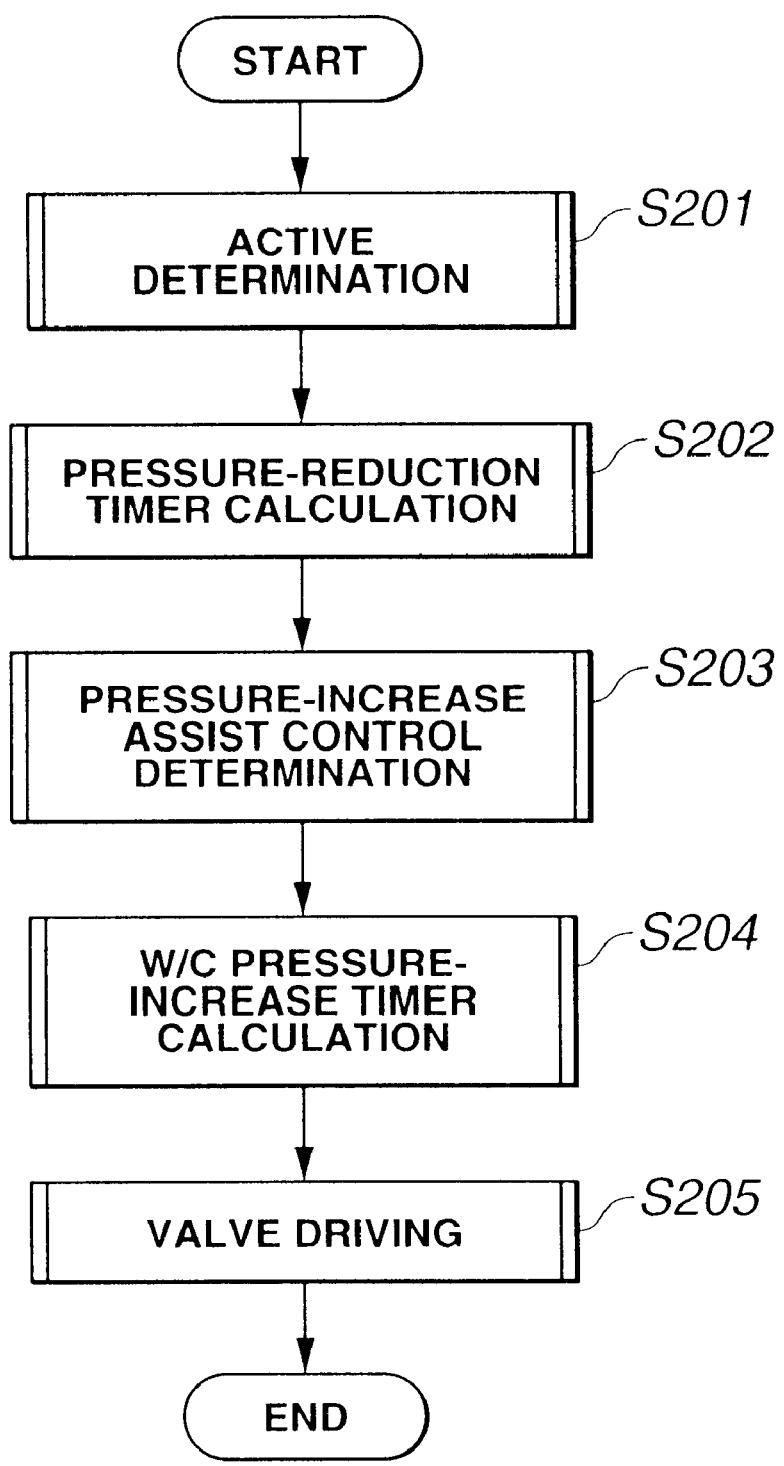
FIG. 2 is a flowchart showing pressure-increase assist control in a first embodiment of the present invention.

Referring to FIGS. 2–7, pressure-increase assist control is described. Referring first to FIG. 2, general flow of pressure-increase assist control is described. At a step S201, active determination is made to determine whether or not the vehicle is required for execution of VSC control. VSC control is a control for stabilizing the vehicle posture by generating a braking force of a desired magnitude in a desired wheel, and thus generating a yaw moment in the vehicle.

At a step S202, a pressure-reduction timer is calculated. The pressure-reduction timer as will be described later serves to count a time for delaying pressure reduction by OUT-side gate valve 1 for pressure-increase assist control. At a step S203, pressure-increase assist determination is made. Pressure-increase assist determination as will be described later serves to determine whether or not pressure-increase assist is carried out and its execution is possible. At a step S204, a W/C pressure-increase timer is calculated. The W/C pressure-increase timer as will be described later serves to count a time for carrying out this pressure-increase assist control to a control target wheel. At a step S205, driving of valves 1, 21, 22, 41, 42, 7 is controlled in accordance with the above calculation of the timers and the above assist control determination.

Figure 3:
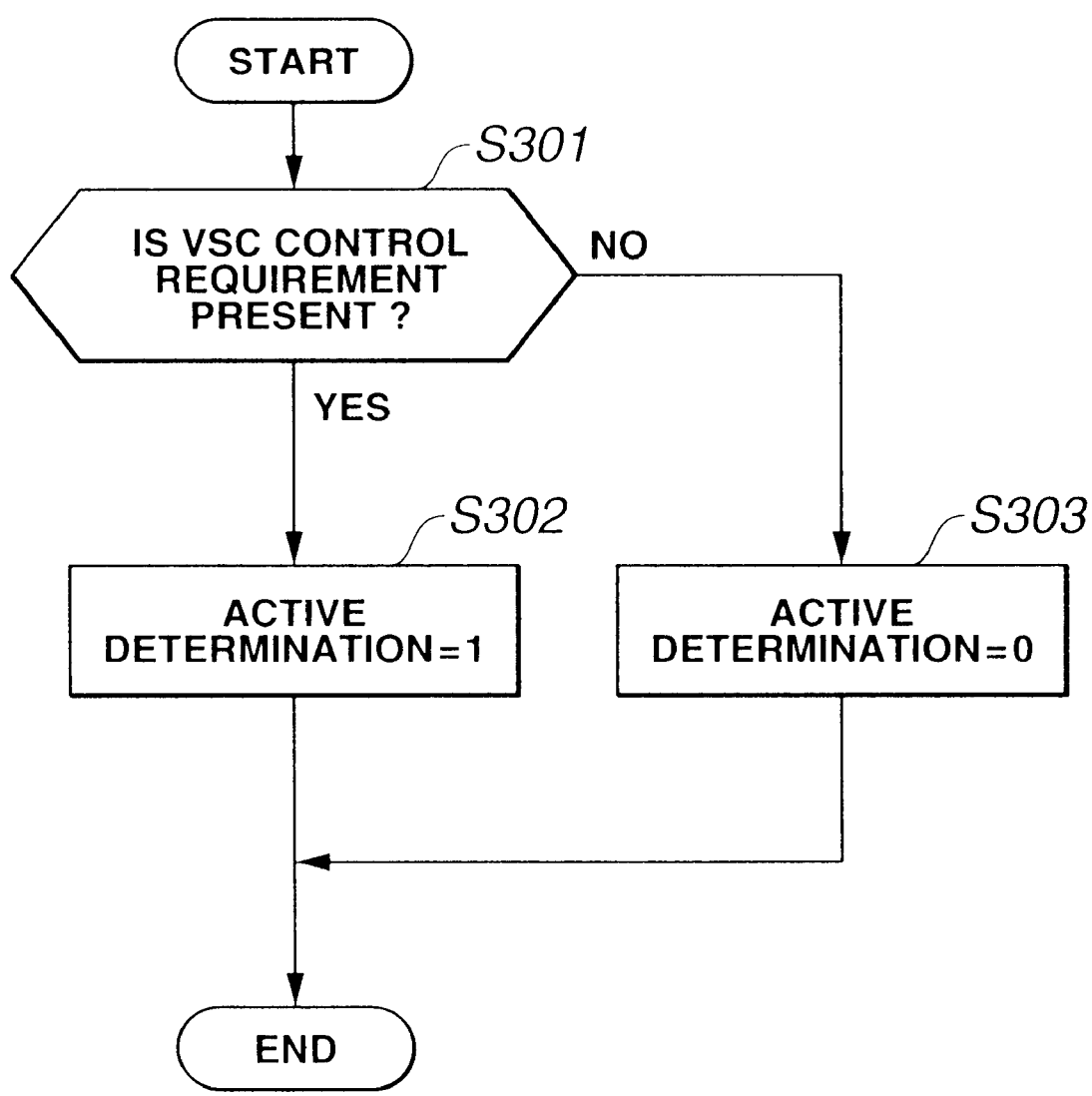
FIG. 3 is a chart similar to FIG. 2, showing active determination in the first embodiment.

Referring to FIGS. 3–7, processing at steps S201–S205 is described in detail. Referring first to FIG. 3, active determination at step S201 is described. At a step S301, it is determined whether or not the VSC control requirement is present. If it is determined that the VSC control requirement is present, flow proceeds to a step S302 where active determination is set to 1, whereas if it is determined that the VSC control requirement is not present, flow proceeds to a step S303 where active determination is reset to zero. That is, when the VSC control requirement is present, active determination is set to 1, and when it is absent, active determination is reset to zero. VSC control itself is ensured by a control part other than that for pressure-increase assist control, the detailed description of which is omitted. The following is a case where VSC control is carried out. When it is detected, in accordance with input signals indicative of the vehicle running conditions, that the vehicle can understeer or oversteer excessively, a braking force is actively generated in a desired wheel to produce a yaw moment in the restraining direction, thus preventing the vehicle from falling in excessive understeer or oversteer. In the disclosure, determination whether or not VSC control is carried out is referred to as active determination.

Figure 4:
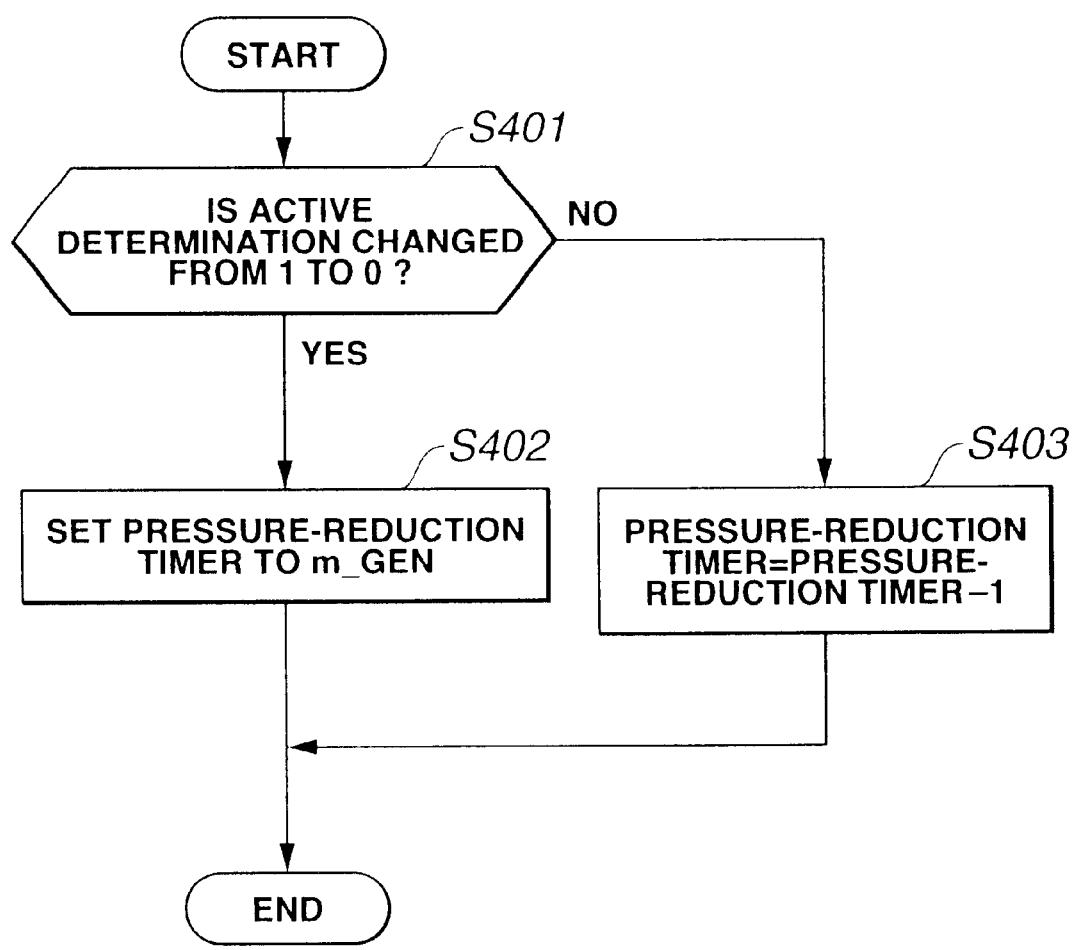
FIG. 4 is a chart similar to FIG. 3, showing calculation of a pressure-reduction timer in the first embodiment.

Referring to FIG. 4, calculation of the pressure-reduction timer at step S202 is described. At a step S401, it is determined whether or not active determination is changed from 1 to zero. If it is determined that active determination is changed from 1 to zero, flow proceeds to a step S402 where the pressure-reduction timer is set to a predetermined value m_GEN, whereas if it is determined that active determination is not changed from 1 to zero, flow proceeds to a step S403 where the pressure-reduction timer is decremented by 1. When the pressure-reduction timer becomes zero, decrement is finished. Therefore, referring to FIG. 8, the pressure-reduction timer carries out count during a predetermined time from immediately after active determination is changed from 1 to zero, wherein predetermined value m_GEN is set to a short time of the order of 500 msec, for example.

Figure 5:
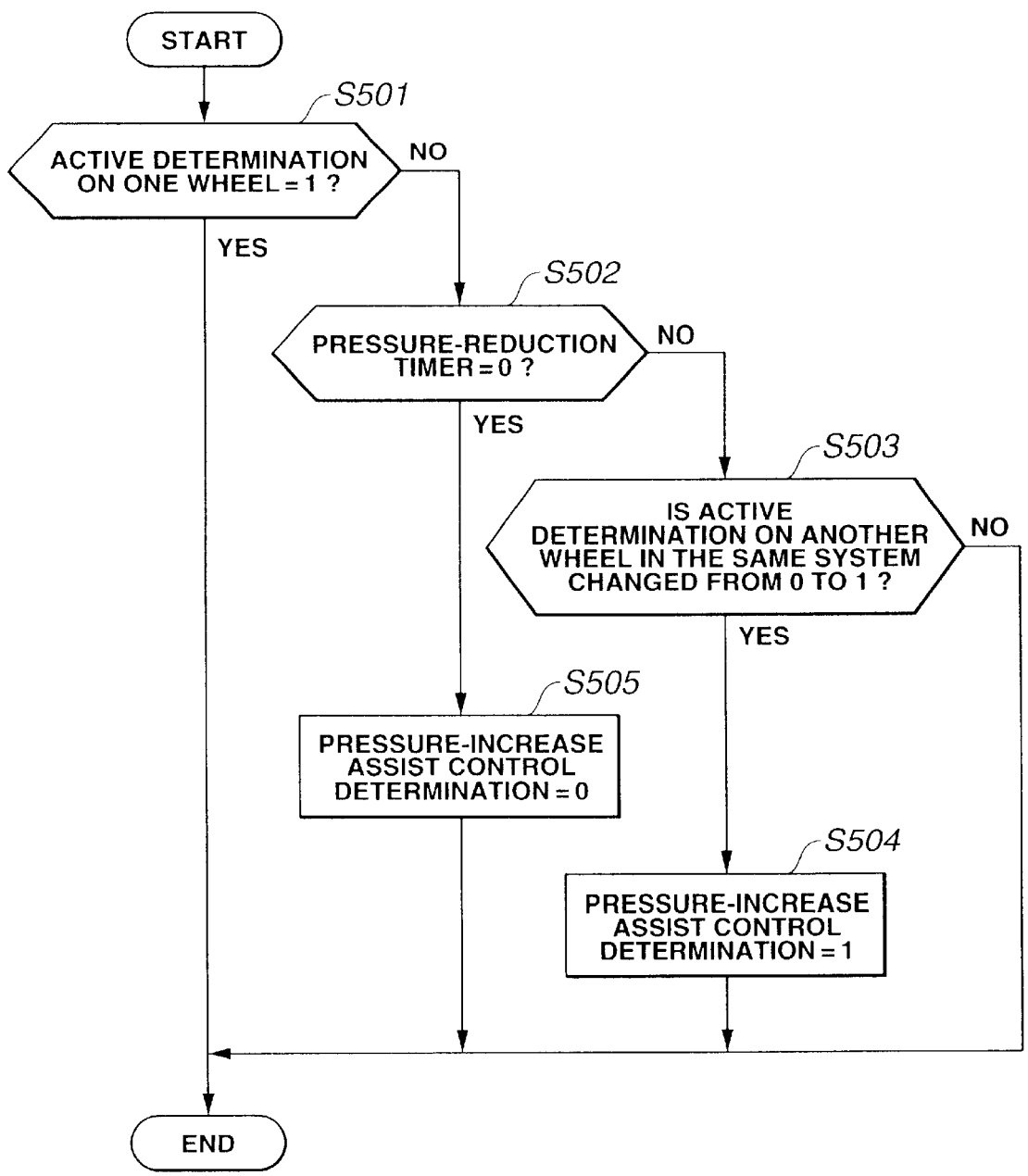
FIG. 5 is a chart similar to FIG. 4, showing pressure-increase assist control determination in the first embodiment.

Referring to FIG. 5, pressure-increase assist determination at step S203 is described. At a step S501, it is determined whether or not active determination on a control target wheel (one wheel in the same system, i.e. one of wheel cylinders WCFR, WCRL connected to brake line H1, which is referred to as "one wheel") is set to 1. If it is determined that active determination=1, one flow is finished, whereas if it is determined that active determination=0, flow proceeds to a step S502. At step S502, it is determined whether or not the pressure-reduction time is reset to zero. If it is determined that the pressure-reduction time=0, one flow is finished, whereas if it is determined that the pressure-reduction time≠0, flow proceeds to a step S503.

At step S503, it is determine whether or not active determination on another wheel in the same system is changed from zero to 1. If it is determine that active determination is changed from zero to 1, flow proceeds to a step S504 where pressure-increase assist control determination is set to 1, whereas if it is determine that active determination is not changed from zero to 1, one flow is finished.

In summary, at processing of pressure-increase assist determination as shown in FIG. 5, after active determination on one wheel is changed from 1 to zero, and when the pressure-reduction timer is being decremented from m_GEN to zero, flow proceeds to step S503. And when active determination on another wheel in the same system is changed from zero to 1 during decrement of the pressure-reduction timer, pressure-increase determination is made.

Figure 6:
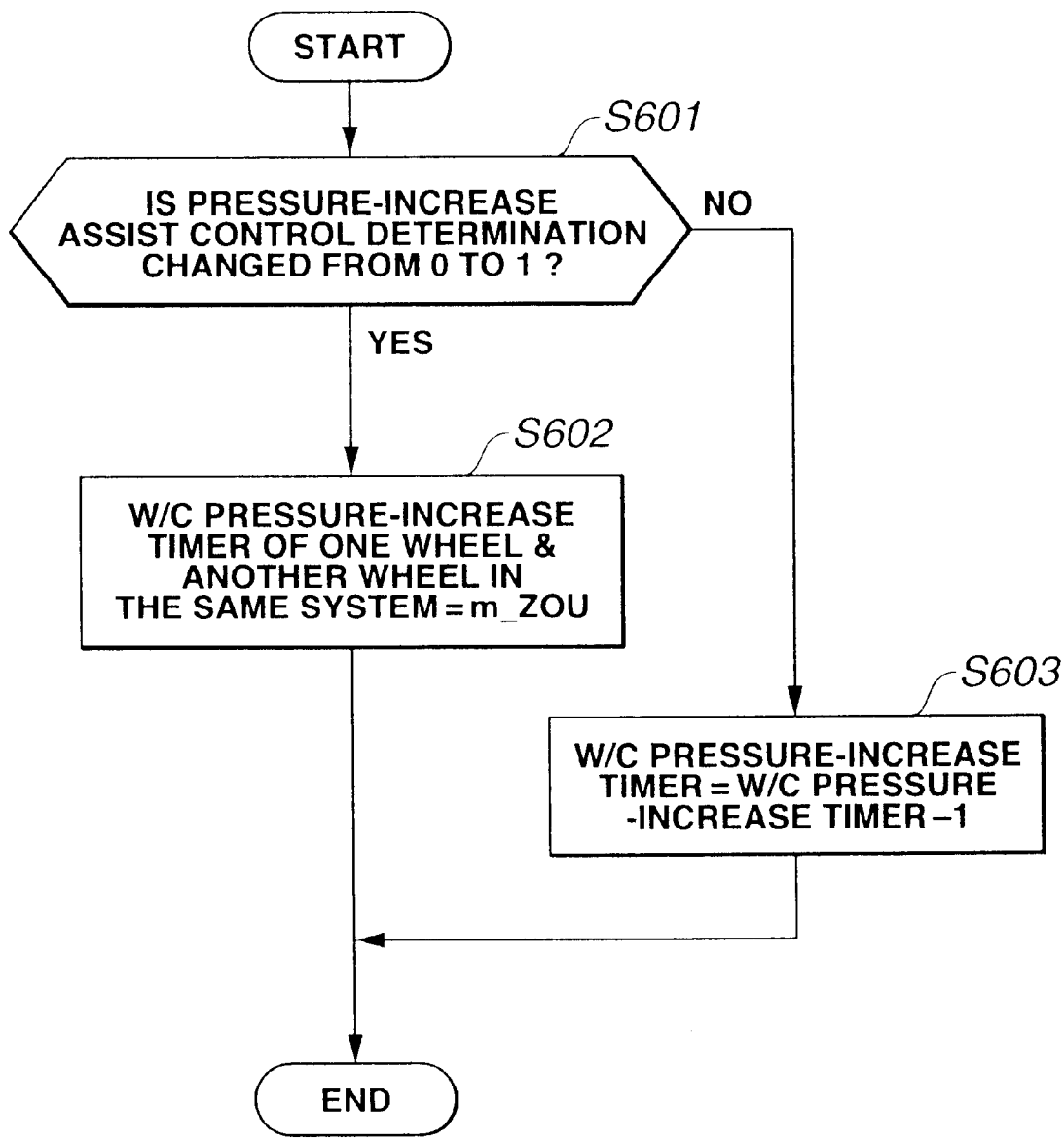
FIG. 6 is a chart similar to FIG. 5, showing calculation of a wheel-cylinder pressure-increase timer in the first embodiment.

Referring to FIG. 6, calculation of the W/C pressure-increase timer at step S204 is described. At a step S601, it is determined whether or not pressure-increase assist control determination is changed from zero to 1. If it is determined that pressure-increase assist control determination is changed from zero to 1, flow proceeds to a step S602 where the pressure-increase timer for wheel cylinders WCFR, WCRL is set to a predetermined value m_ZOU. On the other hand, if it is determined that pressure-increase assist control determination is not changed from zero to 1, flow proceeds to a step S603 where the pressure-increase timer is decremented by 1. When the pressure-increase timer becomes zero, decrement is finished. Predetermined value m_ZOU of the pressure-increase timer is set to a time required for the pressure balance to be achieved in wheel cylinders WCFR, WCRL, which is obtained experimentally in accordance with inlet valves 21, 22 as will be described later. Predetermined value m_ZOU is set to a short time of the order of 70 msec, for example, or it may be controlled variably in accordance with the wheel-cylinder pressure at that time.

Figure 7:
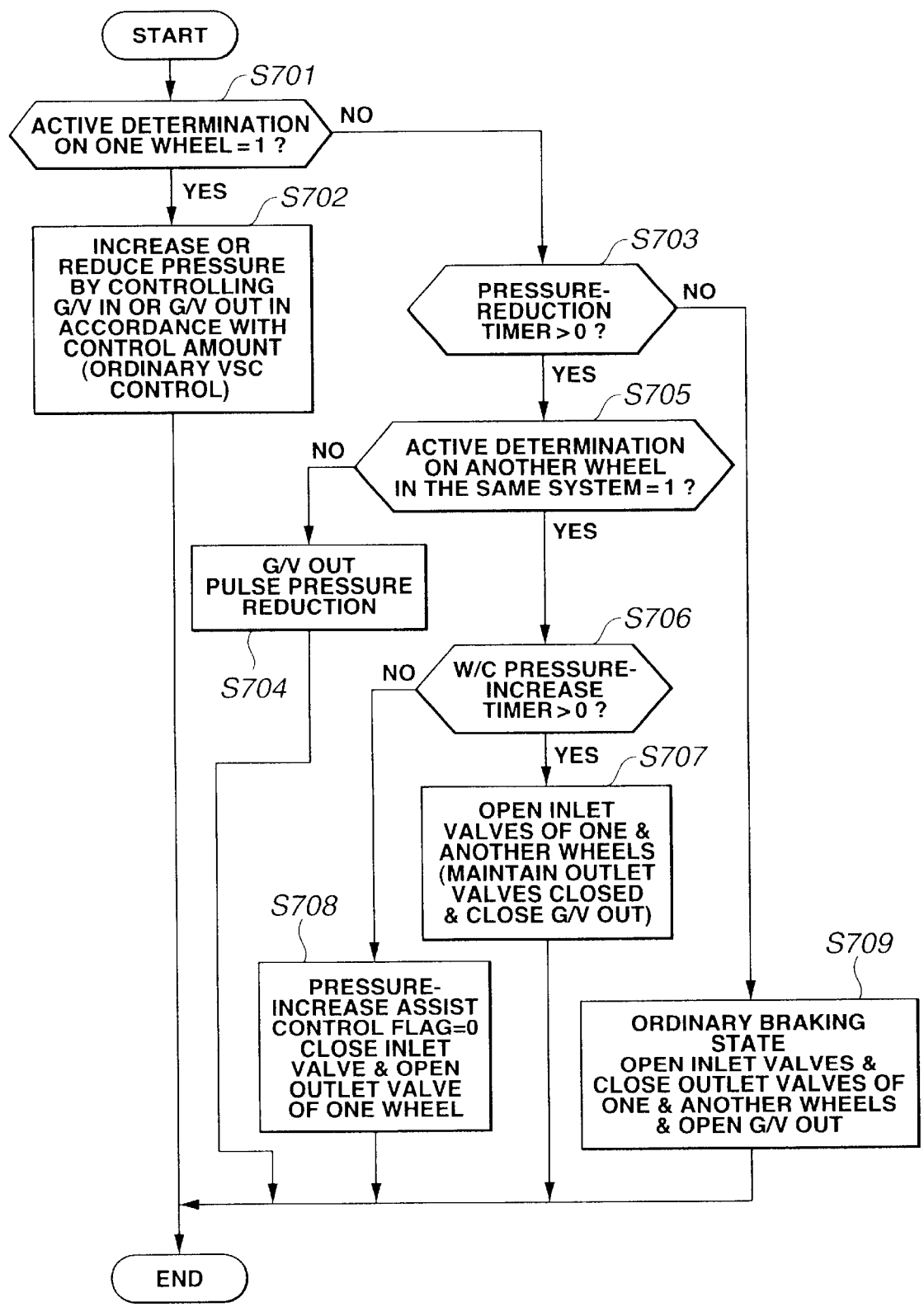
FIG. 7 is a chart similar to FIG. 6, showing valve driving processing in the first embodiment.

Referring to FIG. 7, valve driving processing at step S205 is described. At a step S701, it is determined whether or not active determination on one wheel (one of wheel cylinders WCFR, WCRL) is set to 1. If it is determined that active determination=1, flow proceeds to a step S702 where driving of OUT-side gate valve 1 and IN-side gate valve 7 is controlled in accordance with the control amount determined in a part for carrying out active control, and one of inlet valves 21, 22 of one wheel is opened to increase or decrease the brake-fluid pressure within the wheel cylinder (one of wheel cylinders WCFR, WCRL). Outlet valve 21, 22 of another wheel in the same system is closed at that time.

At step S701, if it is determined that active determination≠1, flow proceeds to a step S703 where it is determined whether or not the pressure-reduction timer is greater than zero. If it is determined that the pressure-reduction timer>0, flow proceeds to a step S705, whereas it is determined that the pressure-reduction timer=0, flow proceeds to a step S709.

At a step S704, a predetermined pulse pressure reduction of OUT-side gate valve 1 is carried out. Specifically, OUT-side gate valve 1 is repeatedly opened and closed to gradually return brake fluid within the wheel cylinder (one of wheel cylinders WCFR, WCRL) of one wheel to master cylinder MC. Conventionally, when active control is completed, OUT-side gate valve 1 is opened to return brake fluid within the wheel cylinder (one of wheel cylinders WCFR, WCRL) of one wheel to master cylinder MC in a stroke.

At step S705, it is determined whether or not active determination on another wheel in the same system is set to 1. If it is determined that active determination on another wheel=1, flow proceeds to a step S706, whereas if it is determined that active determination on another wheel≠1, flow proceeds to step S704.

At step S706, it is determined whether or not the pressure-increase timer of the two wheels is greater than zero, i.e. the W/C pressure-increase timer set in accordance with establishment of pressure-increase assist control determination is being decremented. If it is determined that W/C pressure-increase timer>0, flow proceeds to a step S707, whereas if it is determined that W/C pressure-increase timer≦0, flow proceeds to a step S708.

At step S707, pressure-increase assist control is carried out to open inlet valves 21, 22 of one and another wheels at the same time. At that time outlet valves 41, 42 are both maintained closed, and OUT-side gate valve 1 is closed by interrupting pulse pressure reduction.

At step S708, pressure-increase assist control flag is set zero, and the inlet valve (one of inlet valves 21, 22) of one wheel is closed, and the outlet valve (one of outlet valves 41, 42) is opened during a predetermined time. While active control is carried out for another wheel in the same system, the outlet valve (one of inlet valves 21, 22) is maintained closed. Moreover, the outlet valve (one of outlet valves 41, 42) of one wheel is closed after being opened during a predetermined time.

At step S709, the ordinary brake state is established wherein inlet valves 21, 22, and outlet valves 41, 42 are closed.

Next, the operation of the first embodiment is described. When carrying out lane change or running on an S road, for example, under VSC control, the steering direction is changed from side to side in a short time. When having such cruising, a yaw moment produced in the vehicle varies from side to side in a short time. Moreover, when such cruising is carried out at overspeed, the vehicle can fall in excessive oversteer, the direction of which can be switched from side to side in a short time. In this case, when active control is carried out to generate a braking force for restraining such phenomenon, the state of brake line H1 in the same system can be switched instantaneously from execution of VSC control for providing a braking force to wheel cylinder WCFR of the front-right wheel to execution of VSC control for providing a braking force to wheel cylinder WCRL of the rear-left wheel.

Figure 8:
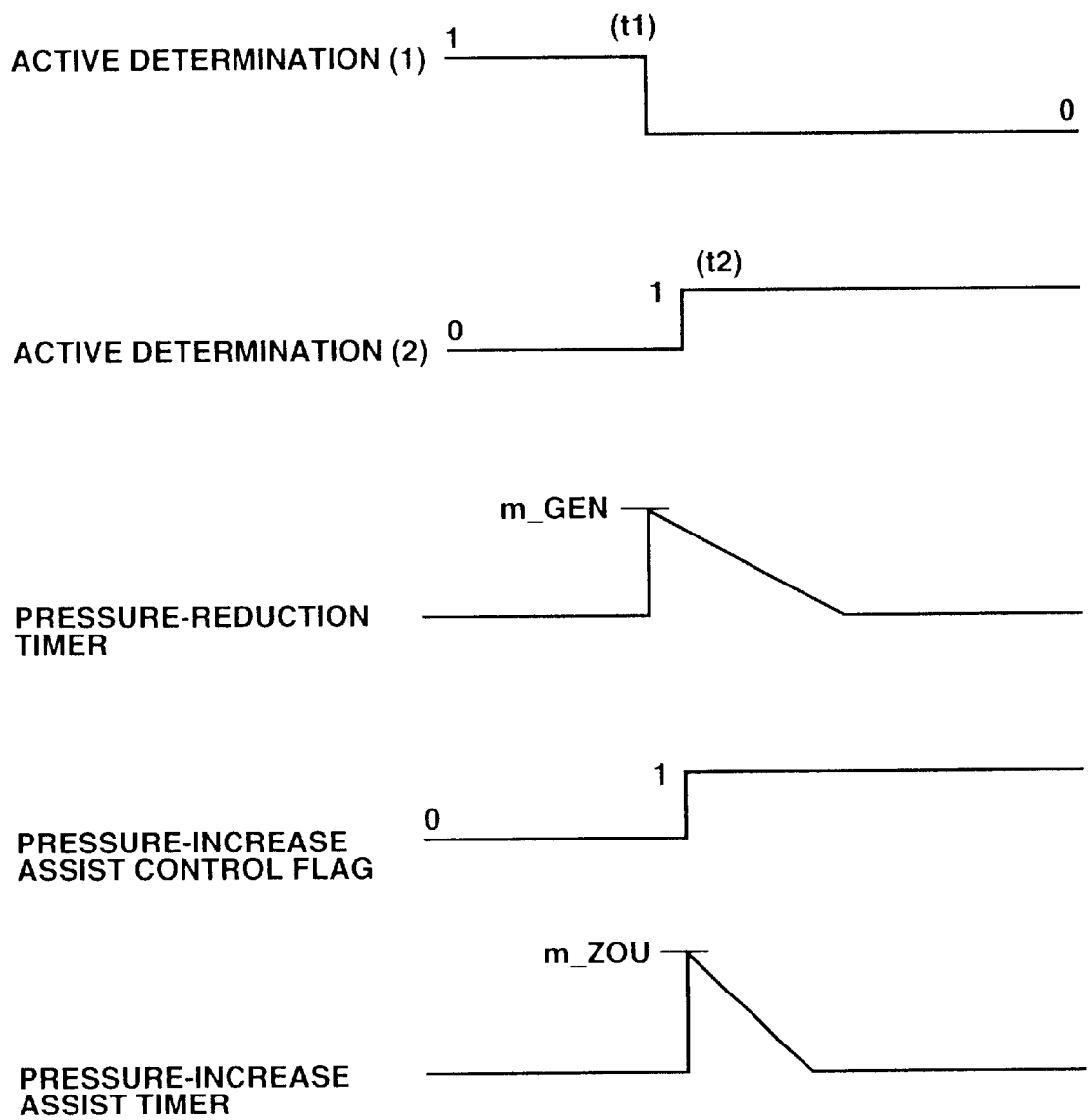
FIG. 8 is a time chart illustrating an example of operation during pressure-increase assist control.

Referring to FIG. 8, a description is made about an example of operation when switching from execution of VSC control for providing a braking force to wheel cylinder WCFR of the front-right wheel as described above to execution of VSC control for providing a braking force to wheel cylinder WCRL of the rear-left wheel through completion of the former VSC control.

When the VSC-control target is switched from the front-right wheel to the rear-left wheel, active determination on the front-right wheel is changed from 1 to zero as shown by point t1 in FIG. 8. In response to this change, the pressure-reduction timer is set to predetermined value m_GEN in accordance with flow of step S401→step S402 at calculation of pressure-reduction timer at step S202. From next control, the pressure-reduction timer is decremented as shown in FIG. 8 in accordance with flow of step S401→step S402.

While the pressure-reduction timer is being decremented after active determination is changed from 1 to zero, pulse pressure reduction of OUT-side gate valve 1 is carried out in accordance with flow of step S701→step S703→step S705→step S704. Conventionally, brake fluid within wheel cylinder WCFR of the front-right wheel is returned to master cylinder MC through outlet valve 21 and OUT-side gate valve 1, whereas in the first embodiment, pressure reduction is carried out gradually by pulse pressure reduction of OUT-side gate valve 1, so that brake fluid remains in wheel cylinder WCFR during execution of pulse pressure reduction of OUT-side gate valve 1.

If active determination on wheel cylinder WCRL of the rear-left wheel is made when the pressure-reduction timer is being decremented as shown by point t2 in FIG. 8, pressure-increase assist control determination is set to 1 in accordance with flow of step S501→step S502→step S503→step S504. And in accordance with flow as shown in FIG. 6, the W/C pressure-increase timer is decremented from m_ZOU. While the pressure-increase timer is grater than zero, pressure-increase assist control is carried out in accordance with flow of step S705→step S706→step S707 to open inlet valves 21, 22 in the same system.

Pressure-increase assist control is carried out to open inlet valves 21, 22 in such a way, so that brake fluid remaining in a circuit between wheel cylinder WCFR of the front-right wheel and OUT-side gate valve 1 is supplied instantaneously until the pressure balance is achieved with respect to wheel cylinder WCRL of the rear-left wheel. This results in greatly enhanced pressure-rise characteristic when starting VSC control for the rear-left wheel as compared with the prior art. Consider the case where under the cornering conditions where VSC control is carried out for wheel cylinder WCFR of the front-right wheel, lateral acceleration acts on the rotor of wheel cylinder WCRL of the rear-left wheel to produce a knock-back phenomenon that the brake piston is displaced in the returning direction. In this case, as soon as the brake piston is returned by supply of the brake-fluid pressure by pressure-increase assist control to start VSC control, the brake piston makes no free run, obtaining higher pressure-rise responsivity in the same way.

Figure 9:
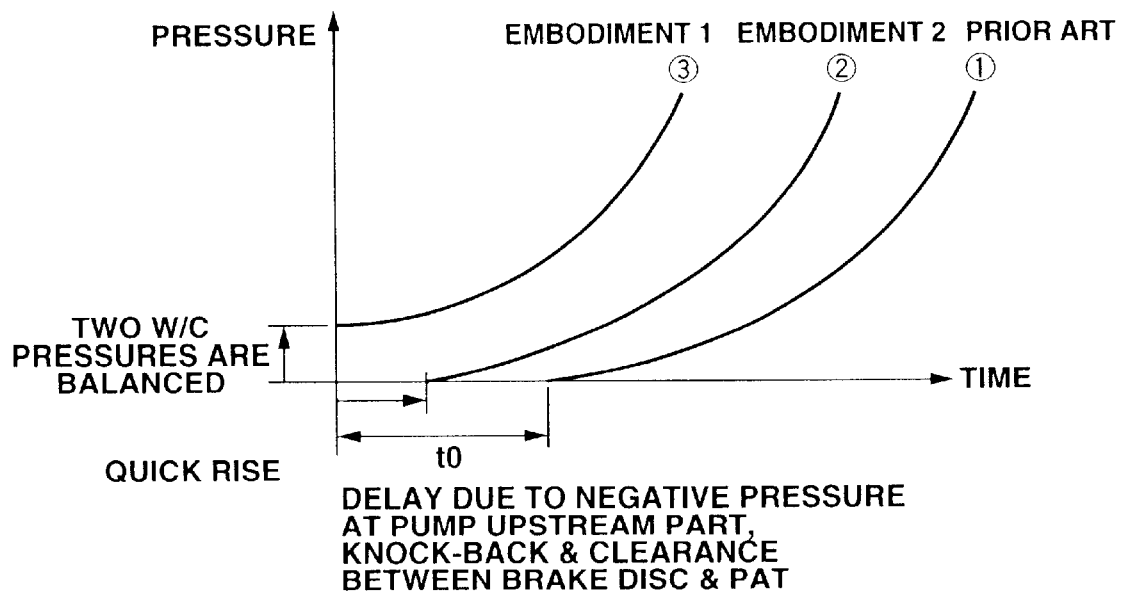
FIG. 9 is a graph illustrating the pressure-rise characteristic during active brake control in the first and second embodiment and the prior art.

FIG. 9 shows the pressure-rise characteristics during VSC control in the first embodiment, the second embodiment as described later, and the prior art. In the prior art, during VSC control, a time t0 is needed from start of control to pressure rise due to pressure-rise characteristic resulting from the negative pressure in the upstream portion of pump P, knock-back and the like. On the other hand, in the first embodiment, at the point that VSC control starts for another wheel, the pressure within the wheel cylinder of another wheel is balanced with the pressure remaining in the wheel cylinder of one wheel which has been subjected to VSC control, so that the pressure is already produced at the point that VSC control is carried out for another wheel as shown in FIG. 9, obtaining excellent pressure-rise characteristic.

Figure 10:
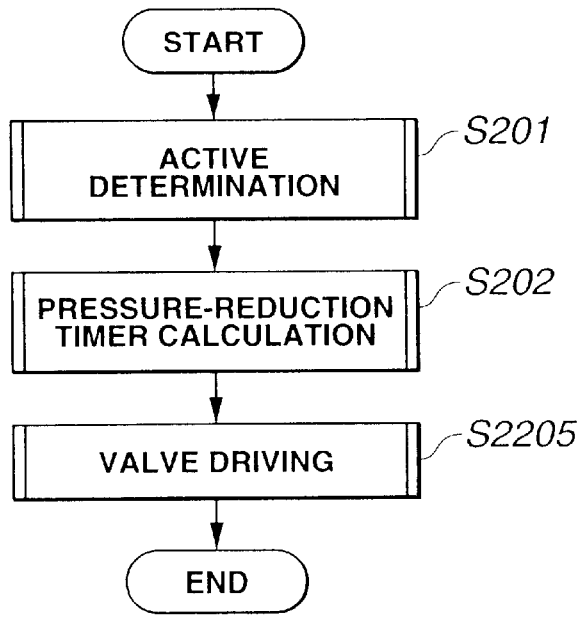
FIG. 10 is a chart similar to FIG. 7, showing pressure-increase assist control in the second embodiment.

Referring to FIG. 10, the second embodiment of the present invention is described, which is substantially the same as the first embodiment except pressure-increase assist control executed by the ECU.

Figure 11:
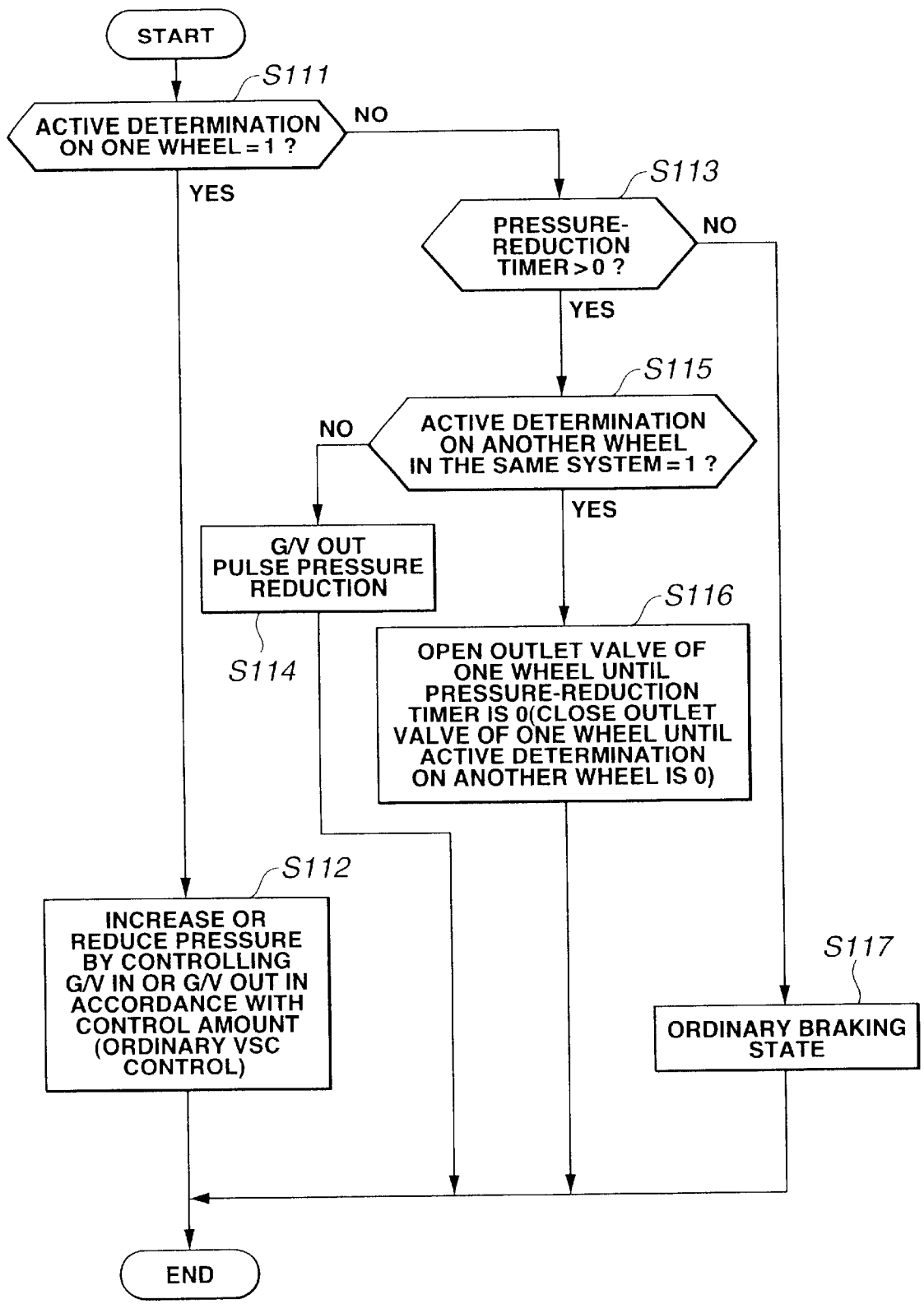
FIG. 11 is a chart similar to FIG. 10, showing valve driving processing in the first embodiment.

As shown in FIG. 10, in the second embodiment, after active determination at step S201 and calculation of the pressure-reduction timer at step S202 in the same way as in the first embodiment, valve driving processing is carried out at a step S2205. Referring to FIG. 11, valve driving processing at step S2205 is described, since its contents are different from those of valve driving processing at step S205 in the first embodiment.

Referring to FIG. 11, at a step S111, it is determined whether or not active determination of one wheel is set to 1. If it is determined that active determination=1, flow proceeds to a step S112 where OUT-side gate valve 1 and IN-side gate valve 7 are controlled in accordance with the control amount to carry out pressure increase or decrease of the wheel cylinder (one of wheel cylinders WCFR, WCRL) of one wheel, i.e. ordinary VSC control.

On the other hand, at step S111, if it is determined that active determination is set to 0, flow proceeds to a step S113 where it is determined whether or not the pressure-reduction timer is greater than zero. If it is determined that the pressure-reduction timer>0, flow proceeds to a step S115 where it is determined whether or not active determination on another wheel in the same system is set to 1. Processing at steps S111–S113 and S115 is the same as that at steps S701–S703 and S705.

At step S115, it is determined that active determination on another wheel in the same system=1, flow proceeds to a step S116 where the outlet valve (one of outlet valves 41, 42) of one wheel is opened, and the inlet valve (one of inlet valves 21, 22) of one wheel is closed until active determination on anther wheel in the same system is reset to zero.

On the other hand, if it is determined that the pressure-reduction timer≦0, flow proceeds to a step S117 where the ordinary brake state is established in the same way as at step S709.

Next, a description is made about operation in the second embodiment when switching from execution of VSC control for providing a braking force to wheel cylinder WCRL of the front-right wheel as described above to execution of VSC control for providing a braking force to wheel cylinder WCRL of the rear-left wheel through completion of the former VSC control.

When the VSC-control target is switched from the front-right wheel to the rear-left wheel, active determination on the front-right wheel is changed from 1 to zero. In response to this change, the pressure-reduction timer is set to predetermined value m_GEN which may be set to a value different from that in the first embodiment. From next control, the pressure-reduction timer is decremented.

While the pressure-reduction timer is being decremented after active determination is changed from 1 to zero, pulse pressure reduction of OUT-side gate valve 1 is carried out in accordance with flow of step S111→step S113→step S115→step S114. Conventionally, brake fluid within wheel cylinder WCFR of the front-right wheel is returned to master cylinder MC through outlet valve 21 and OUT-side gate valve 1, whereas in the second embodiment, pressure reduction is carried out gradually by pulse pressure reduction of OUT-side gate valve 1, so that brake fluid remains in wheel cylinder WCFR during execution of pulse pressure reduction of OUT-side gate valve 1.

If active determination on wheel cylinder WCRL of the rear-left wheel is made when the pressure-reduction timer is being decremented, outlet valve 41 of the front-right wheel is opened in accordance with flow of step S115→step S116 until the pressure-reduction timer of one wheel (front-right wheel) is reset to zero, so that brake fluid remaining in a circuit between wheel cylinder WCFR of the front-right wheel and OUT-side gate valve 1 is supplied to pump P through drain circuit 3 and first suction circuit 51. Optionally, at processing at step S116, during execution of this processing or only in the initial stage thereof, IN-side gate valve 7 may be closed. Conventionally, pump P sucks brake fluid having atmospheric pressure from maser cylinder MC, whereas in the second embodiment, pump P is supplied with brake fluid having higher pressure than the atmospheric pressure, providing the discharge pressure shifted to a higher value by that amount. Referring to FIG. 9, this results in greatly enhanced rise responsivity of the brake-fluid pressure of another wheel in the same system as compared with the prior art. When closing IN-side gate valve 7 as described in an alternative, the brake-fluid pressure remaining in the wheel cylinder is sucked by pump P without being discharged to second supply circuit 52, resulting further enhanced rise responsivity.

Having described the present invention with regard to the illustrative embodiments, it is noted that the present invention is not limited thereto, and various changes and modifications can be made without departing from the scope of the present invention.

By way of example, in the illustrative embodiments, the present invention is applied to an X-type brake line having two divided line systems. Optionally, the present invention can be applied to another type of brake line having two line systems divided longitudinally or laterally.

Further, in the illustrative embodiments, the fluid-pressure generating means include master cylinder MC. Alternatively, the fluid-pressure generating means may include a pump or a pressure-accumulator source.

The entire contents of Japanese Patent Application P2002-009038 filed Jan. 17, 2002 are hereby incorporated by reference.

What is claimed is:

1. A brake control system for a motor vehicle, comprising:
   a source of a brake-fluid pressure;
   a brake line connected to the source;
   an OUT-side gate valve arranged in the brake line, the OUT-side gate valve serving to open and close the brake line;
   branch lines branched from the brake line downstream of the OUT-side gate valve to wheel cylinders;
   inlet valves arranged in the respective branch lines, each inlet valve serving to open and close the corresponding branch line;
   a drain circuit which serves to discharge the brake-fluid pressure within each wheel cylinder to a reservoir;
   outlet valves arranged in the drain circuit, each outlet valve serving to open and close the drain circuit;
   a pump which supplies the brake-fluid pressure to a supply line of the brake line downstream of the OUT-side gate valve; and
   an ECU which controls operation of the valves and the pump, the ECU being so constructed as to:
   supply the brake-fluid pressure to the supply line by driving the pump with an opening of the OUT-side gate valve restrained;
   carry out active brake control for independently controlling the brake-fluid pressures within the wheel cylinders by selectively opening and closing the inlet valves;
   return the brake-fluid pressures within the wheel cylinders to the source by opening the OUT-side gate valve at completion of active brake control; and
   carry out pressure-increase assist control for restraining the opening of the OUT-side gate valve and opening the inlet valves during a predetermined time when active brake control is switched from a state that it is effective for only one of the wheel cylinders to a state that it is effective for only another wheel cylinder.

2. The brake control system as claimed in claim 1, wherein when restraining the opening of the OUT-side gate valve during execution of pressure-increase assist control, the ECU carries out pulse pressure reduction to gradually reduce the brake-fluid pressure within the one wheel cylinder.

3. A brake control system for a motor vehicle, comprising:
   a source of a brake-fluid pressure;
   a brake line connected to the source;
   an OUT-side gate valve arranged in the brake line, the OUT-side gate valve serving to open and close the brake line;
   branch lines branched from the brake line downstream of the OUT-side gate valve to wheel cylinders;
   inlet valves arranged in the respective branch lines, each inlet valve serving to open and close the corresponding branch line;
   a drain circuit which serves to discharge the brake-fluid pressure within each wheel cylinder to a reservoir;
   outlet valves arranged in the drain circuit, each outlet valve serving to open and close the drain circuit;
   a pump which supplies the brake-fluid pressure to a supply line of the brake line downstream of the OUT-side gate valve;
   first and second suction circuits, the first suction circuit connecting a suction side of the pump and the reservoir, the second suction circuit connecting the suction side of the pump and the source; and
   an ECU which controls operation of the valves and the pump, the ECU being so constructed as to:
   supply the brake-fluid pressure to the supply line by driving the pump with an opening of the OUT-side gate valve restrained;
   carry out active brake control for independently controlling the brake-fluid pressures within the wheel cylinders by selectively opening and closing the inlet valves;

return the brake-fluid pressures within the wheel cylinders to the source by opening the OUT-side gate valve at completion of active brake control; and carry out pressure-increase assist control for restraining the opening of the OUT-side gate valve and opening the outlet valve of one of the wheel cylinders during a predetermined time when active brake control is switched from a state that it is effective for only one wheel cylinder to a state that it is effective for only another wheel cylinder.

4. The brake control system as claimed in claim 3, wherein when restraining the opening of the OUT-side gate valve during execution of pressure-increase assist control, the ECU carries out pulse pressure reduction to gradually reduce the brake-fluid pressure within the one wheel cylinder.

5. A motor vehicle, comprising:
a source of a brake-fluid pressure;
wheel cylinders connected to the source; and
a brake control system comprising:
    a brake line connected to the source;
    an OUT-side gate valve arranged in the brake line, the OUT-side gate valve serving to open and close the brake line;
    branch lines branched from the brake line downstream of the OUT-side gate valve to the wheel cylinders;
    inlet valves arranged in the respective branch lines, each inlet valve serving to open and close the corresponding branch line;
    a drain circuit which serves to discharge the brake-fluid pressure within each wheel cylinder to a reservoir;
    outlet valves arranged in the drain circuit, each outlet valve serving to open and close the drain circuit;
    a pump which supplies the brake-fluid pressure to a supply line of the brake line downstream of the OUT-side gate valve; and
    an ECU which controls operation of the valves and the pump, the ECU being so constructed as to:
        supply the brake-fluid pressure to the supply line by driving the pump with an opening of the OUT-side gate valve restrained;
        carry out active brake control for independently controlling the brake-fluid pressures within the wheel cylinders by selectively opening and closing the inlet valves;
        return the brake-fluid pressures within the wheel cylinders to the source by opening the OUT-side gate valve at completion of active brake control; and
        carry out pressure-increase assist control for restraining the opening of the OUT-side gate valve and opening the inlet valves during a predetermined time when active brake control is switched from a state that it is effective for only one of the wheel cylinders to a state that it is effective for only another wheel cylinder.

6. The motor vehicle as claimed in claim 5, wherein when restraining the opening of the OUT-side gate valve during execution of pressure-increase assist control, the ECU carries out pulse pressure reduction to gradually reduce the brake-fluid pressure within the one wheel cylinder.

7. A motor vehicle, comprising:
a source of a brake-fluid pressure;
wheel cylinders connected to the source; and
a brake control system comprising:
    an OUT-side gate valve arranged in the brake line, the OUT-side gate valve serving to open and close the brake line;
    branch lines branched from the brake line downstream of the OUT-side gate valve to the wheel cylinders;
    inlet valves arranged in the respective branch lines, each inlet valve serving to open and close the corresponding branch line;
    a drain circuit which serves to discharge the brake-fluid pressure within each wheel cylinder to a reservoir;
    outlet valves arranged in the drain circuit, each outlet valve serving to open and close the drain circuit;
    a pump which supplies the brake-fluid pressure to a supply line of the brake line downstream of the OUT-side gate valve;
    first and second suction circuits, the first suction circuit connecting a suction side of the pump and the reservoir, the second suction circuit connecting the suction side of the pump and the source; and
    an ECU which controls operation of the valves and the pump, the ECU being so constructed as to:
        supply the brake-fluid pressure to the supply line by driving the pump with an opening of the OUT-side gate valve restrained;
        carry out active brake control for independently controlling the brake-fluid pressures within the wheel cylinders by selectively opening and closing the inlet valves;
        return the brake-fluid pressures within the wheel cylinders to the source by opening the OUT-side gate valve at completion of active brake control; and
        carry out pressure-increase assist control for restraining the opening of the OUT-side gate valve and opening the outlet valve of one of the wheel cylinders during a predetermined time when active brake control is switched from a state that it is effective for only one wheel cylinder to a state that it is effective for only another wheel cylinder.

8. The motor vehicle as claimed in claim 7, wherein when restraining the opening of the OUT-side gate valve during execution of pressure-increase assist control, the ECU carries out pulse pressure reduction to gradually reduce the brake-fluid pressure within the one wheel cylinder.

9. A method of controlling a braking device for a motor vehicle, the braking device comprising:
a source of a brake-fluid pressure;
a brake line connected to the source;
an OUT-side gate valve arranged in the brake line, the OUT-side gate valve serving to open and close the brake line;
branch lines branched from the brake line downstream of the OUT-side gate valve to wheel cylinders;
inlet valves arranged in the respective branch lines, each inlet valve serving to open and close the corresponding branch line;
a drain circuit which serves to discharge the brake-fluid pressure within each wheel cylinder to a reservoir;
outlet valves arranged in the drain circuit, each outlet valve serving to open and close the drain circuit; and
a pump which supplies the brake-fluid pressure to a supply line of the brake line downstream of the OUT-side gate valve,
the method comprising:
    supplying the brake-fluid pressure to the supply line by driving the pump with an opening of the OUT-side gate valve restrained;

carrying out active brake control for independently controlling the brake-fluid pressures within the wheel cylinders by selectively opening and closing the inlet valves;

returning the brake-fluid pressures within the wheel cylinders to the source by opening the OUT-side gate valve at completion of active brake control; and carrying out pressure-increase assist control for restraining the opening of the OUT-side gate valve and opening the inlet valves during a predetermined time when active brake control is switched from a state that it is effective for only one of the wheel cylinders to a state that it is effective for only another wheel cylinder.

10. A method of controlling a braking device for a motor vehicle, the braking device comprising:

a source of a brake-fluid pressure;

a brake line connected to the source;

an OUT-side gate valve arranged in the brake line, the OUT-side gate valve serving to open and close the brake line;

branch lines branched from the brake line downstream of the OUT-side gate valve to wheel cylinders;

inlet valves arranged in the respective branch lines, each inlet valve serving to open and close the corresponding branch line;

a drain circuit which serves to discharge the brake-fluid pressure within each wheel cylinder to a reservoir;

outlet valves arranged in the drain circuit, each outlet valve serving to open and close the drain circuit;

a pump which supplies the brake-fluid pressure to a supply line of the brake line downstream of the OUT-side gate valve; and first and second suction circuits, the first suction circuit connecting a suction side of the pump and the reservoir, the second suction circuit connecting the suction side of the pump and the source;

the method comprising:

supplying the brake-fluid pressure to the supply line by driving the pump with an opening of the OUT-side gate valve restrained;

carrying out active brake control for independently controlling the brake-fluid pressures within the wheel cylinders by selectively opening and closing the inlet valves;

returning the brake-fluid pressures within the wheel cylinders to the source by opening the OUT-side gate valve at completion of active brake control; and carrying out pressure-increase assist control for restraining the opening of the OUT-side gate valve and opening the outlet valve of one of the wheel cylinders during a predetermined time when active brake control is switched from a state that it is effective for only one wheel cylinder to a state that it is effective for only another wheel cylinder.

* * * * *